(12) United States Patent
Ahn et al.

(10) Patent No.: US 11,868,645 B2
(45) Date of Patent: Jan. 9, 2024

(54) MEMORY DEVICE, STORAGE DEVICE INCLUDING THE SAME AND METHOD OF OPERATING THE STORAGE DEVICE

(71) Applicant: Samsung Electronics Co., Ltd., Suwon-si (KR)

(72) Inventors: Hosung Ahn, Gwangmyeong-si (KR); Younsoo Cheon, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/240,152

(22) Filed: Apr. 26, 2021

(65) Prior Publication Data

US 2022/0113896 A1    Apr. 14, 2022

(30) Foreign Application Priority Data

Oct. 14, 2020    (KR) .................... 10-2020-0132979

(51) Int. Cl.
*G06F 3/06*    (2006.01)

(52) U.S. Cl.
CPC .......... *G06F 3/0655* (2013.01); *G06F 3/0604* (2013.01); *G06F 3/064* (2013.01); *G06F 3/0679* (2013.01)

(58) Field of Classification Search
USPC ....................................................... 711/154
See application file for complete search history.

(56) References Cited

U.S. PATENT DOCUMENTS

| | | | |
|---|---|---|---|
| 7,477,547 B2 | 1/2009 | Lin | |
| 8,687,421 B2 | 4/2014 | Avila et al. | |
| 8,966,343 B2 | 2/2015 | Syu et al. | |
| 9,092,316 B2 * | 7/2015 | Iliadis | G06F 12/0246 |
| 9,165,668 B1 | 10/2015 | Zhao et al. | |
| 9,535,782 B2 | 1/2017 | Agrawal et al. | |
| 10,163,515 B1 * | 12/2018 | Kumar | G11C 11/4096 |
| 10,224,111 B2 | 3/2019 | Li et al. | |

(Continued)

FOREIGN PATENT DOCUMENTS

KR    10-1821515 B1    1/2018

OTHER PUBLICATIONS

L. Shi, K. Wu, M. Zhao, C. J. Xue, D. Liu and E. H.-. Sha, "Retention Trimming for Lifetime Improvement of Flash Memory Storage Systems," in IEEE Transactions on Computer-Aided Design of Integrated Circuits and Systems, vol. 35, No. 1, pp. 58-71, Jan. 2016, doi: 10.1109/TCAD.2015.2453369. (Year: 2016).*

(Continued)

*Primary Examiner* — Sanjiv Shah
*Assistant Examiner* — Elias Young Kim
(74) *Attorney, Agent, or Firm* — Harness, Dickey & Pierce, P.L.C.

(57) ABSTRACT

A method of operating a controller for controlling a memory device that comprises a plurality of memory cell blocks including outputting block address information based on reliability information for each of the memory cell blocks, providing a patrol read command to the memory device, and controlling the memory device to perform the patrol read operation in response to the patrol read command wherein the block address information comprises an order of the patrol read operation for the memory cell blocks based on the reliability information may be provided.

20 Claims, 15 Drawing Sheets

(56) References Cited

U.S. PATENT DOCUMENTS

| | | | |
|---|---|---|---|
| 10,521,341 B2 | 12/2019 | Lee | |
| 2013/0111115 A1* | 5/2013 | Iliadis | G06F 12/02 711/E12.008 |
| 2013/0326269 A1 | 12/2013 | Losh et al. | |
| 2013/0326284 A1* | 12/2013 | Losh | G06F 11/2053 714/47.2 |
| 2014/0245109 A1 | 8/2014 | Yim et al. | |
| 2016/0071612 A1* | 3/2016 | Takizawa | G06F 12/0246 365/185.11 |
| 2016/0110249 A1* | 4/2016 | Orme | G06F 11/1048 714/6.24 |
| 2017/0123870 A1* | 5/2017 | Tai | G06F 11/076 |
| 2017/0286288 A1 | 10/2017 | Higgins et al. | |
| 2017/0364300 A1* | 12/2017 | Wu | G06F 3/0641 |
| 2018/0047456 A1* | 2/2018 | Zhang | G11C 29/42 |
| 2018/0239547 A1* | 8/2018 | Inbar | G06F 11/1441 |
| 2019/0196958 A1 | 6/2019 | Lee | |
| 2020/0050368 A1* | 2/2020 | Lee | G06F 3/0626 |
| 2020/0090763 A1* | 3/2020 | Tokutomi | G06F 11/1068 |
| 2020/0265903 A1* | 8/2020 | Kim | G11C 29/028 |
| 2021/0081109 A1* | 3/2021 | Wang | G06F 3/0653 |

OTHER PUBLICATIONS

Y. Luo, Y. Cai, S. Ghose, J. Choi and O. Mutlu, "WARM: Improving NAND flash memory lifetime with write-hotness aware retention management," 2015 31st Symposium on Mass Storage Systems and Technologies (MSST), 2015, pp. 1-14, doi: 10.1109/MSST.2015.7208284. (Year: 2015).*

European Extended Search Report dated Nov. 29, 2021 issued in corresponding European Patent Application No. 21179241.1-1209.

* cited by examiner

FIG. 7

| INDEX | PE # | PG order |
|---|---|---|
| BLK1 | 18 | 1 |
| BLK2 | 25 | 3 |
| BLK3 | 37 | 6 |
| BLK4 | 105 | 5 |
| BLK5 | 80 | 2 |
| BLK6 | 57 | 8 |
| BLK7 | 210 | 7 |
| BLK8 | 78 | 9 |
| BLK9 | 10 | 4 |

FIG. 8A

| QUEUE | PE # | INDEX |
|---|---|---|
| 1 | 210 | BLK7 |
| 2 | 105 | BLK4 |
| 3 | 80 | BLK5 |
| 4 | 78 | BLK8 |
| 5 | 57 | BLK6 |
| 6 | 37 | BLK3 |
| 7 | 25 | BLK2 |
| 8 | 18 | BLK1 |
| 9 | 10 | BLK9 |

FIG. 8B

| QUEUE | PG order | INDEX |
|---|---|---|
| 1 | 1 | BLK1 |
| 2 | 2 | BLK5 |
| 3 | 3 | BLK2 |
| 4 | 4 | BLK9 |
| 5 | 5 | BLK4 |
| 6 | 6 | BLK3 |
| 7 | 7 | BLK7 |
| 8 | 8 | BLK6 |
| 9 | 9 | BLK8 |

MEMORY DEVICE, STORAGE DEVICE INCLUDING THE SAME AND METHOD OF OPERATING THE STORAGE DEVICE

CROSS-REFERENCE TO RELATED APPLICATION

This application is based on and claims priority under 35 U.S.C. § 119 to Korean Patent Application No. 10-2020-0132979, filed on Oct. 14, 2020, in the Korean Intellectual Property Office, the disclosure of which is incorporated by reference herein in its entirety.

BACKGROUND

The inventive concepts relate to memory devices, and more particularly, to memory devices, storage devices including the same, and methods of operating the storage device.

As a non-volatile memory, a flash memory may retain stored data even when power is interrupted. Recently, storage devices including flash memories like an embedded multi-media card (eMMC), a universal flash storage (UFS), a solid state drive (SSD), and a memory card have been widely used, and the storage devices are useful for storing or transporting a large amount of data. Therefore, methods and apparatuses for improving the reliability of a storage device are being continuously demanded.

SUMMARY

The inventive concepts provide memory devices capable of improving reliability of the memory device and a storage device including the memory device, storage devices including the memory device, and methods of operating the storage device.

According to an aspect of the inventive concepts, a method of operating a controller for controlling a memory device that comprises a plurality of memory cell blocks may include outputting block address information based on reliability information for each of the memory cell blocks, providing a patrol read command to the memory device, and controlling the memory device to perform the patrol read operation in response to the patrol read command wherein the block address information comprises an order of the patrol read operation for the memory cell blocks based on the reliability information.

According to another aspect of the inventive concepts, a storage device including a memory device that is configured to perform a patrol read operation may include controlling the memory device by providing block address information to the memory device based on a patrol read command and reliability information for each of a plurality of memory cell blocks, and generating information regarding reclaim target blocks on which reclaim operations are to be performed from among the memory cell blocks on which the patrol read operations are performed, wherein the block address information comprises an order of the patrol read operation for the memory cell blocks based on the reliability information.

According to another aspect of the inventive concepts, a controller for a storage device may include at least one processor that is configured to generate a patrol read command in response to a patrol read instruction, generate block address information based on reliability information for each of a plurality of memory cell blocks included in the storage device, and provide the patrol read command and the block address information to the memory device, wherein the block address information comprises an order of the patrol read operation for the memory cell blocks based on the reliability information.

According to another aspect of the inventive concepts, a storage device may include a memory device that comprises a plurality of memory cell blocks and is configured to generate information regarding reclaim target blocks on which reclaim operations are to be performed based on patrol read operations for respective memory cell blocks, and a controller configured to provide block address information to the memory device determined based on a patrol read command and reliability information for each of the memory cell blocks, wherein the block address information comprises an order of the patrol read operation for the memory cell blocks based on the reliability information.

BRIEF DESCRIPTION OF THE DRAWINGS

Example embodiments of the inventive concepts will be more clearly understood from the following detailed description taken in conjunction with the accompanying drawings in which:

FIG. 7 is a table showing reliability information regarding a memory cell block according to an example embodiment;

FIGS. 8A and 8B are tables showing priorities to perform a patrol read operation based on reliability information according to some example embodiments of the inventive concepts;

DETAILED DESCRIPTION

Figure 1:
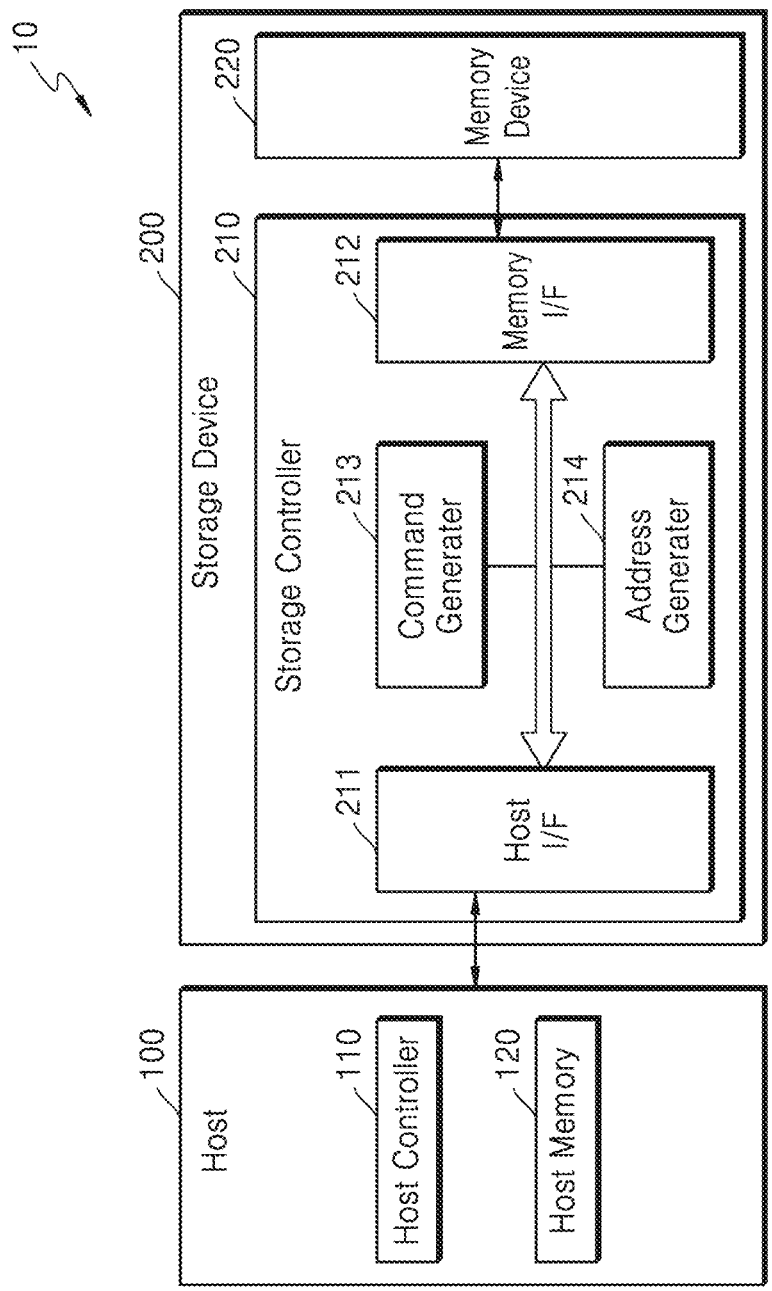
FIG. 1 is a block diagram showing a storage system according to an example embodiment of the inventive concepts.

FIG. 1 is a block diagram showing a storage system according to an example embodiment of the inventive concepts.

A storage system 10 may be implemented as, for example, a personal computer (PC), a data server, a network-attached storage (NAS), an Internet of Things (IoT) device, or a portable electronic device. The portable electronic device may be a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book device, a wearable device, etc.

The storage system 10 may include a storage device 200 and a host 100. The host 100 may control the operation of the storage device 200, and the host 100 may include a host controller 110 and a host memory 120. The host memory 120 may function as a buffer memory for temporarily storing data to be transmitted to the storage device 200 or data transmitted from the storage device 200. In an example embodiment, the storage device 200 may include one or more solid state drives (SSD). When the storage device 200 includes an SSD, the storage device 200 may include a plurality of flash memory chips (e.g., NAND memory devices) for storing data.

The storage device 200 may correspond to a flash memory device including one or more flash memory devices. In an example embodiment, the storage device 200 may be an embedded memory included in the storage system 10. For example, the storage device 200 may be an embedded multi-media card (eMMC) or an embedded universal flash storage (UFS) memory device. In an example embodiment, the storage device 200 may be an external memory detachably attached to the storage system 10. For example, the storage device 200 may be a UFS memory card, a compact flash (CF) card, a secure digital (SD) card, a micro secure digital (SD) card, a mini secure digital (SD) card, an extreme digital (xD) card, or a memory stick.

Referring to FIG. 1, the storage device 200 may include a storage controller 210 and a memory device 220. The host 100 may communicate with the storage device 200 through various interfaces and may transmit requests like a read request and a program request to the storage device 200. In an example embodiment, the host 100 may be implemented as an application processor (AP) or a system-on-a-chip (SoC).

The storage controller 210 may control the operation of the memory device 220 through at least one channel. The storage controller 210 may control the memory device 220 to read data DATA stored in the memory device 220 in response to a read request from the host 100 or program the data DATA to the memory device 220 in response to a program request from the host 100.

When a patrol read event occurs, the storage controller 210 may perform a patrol read operation by controlling the memory device 220. The patrol read event may include a case of receiving a patrol read instruction from the host 100. However, example embodiments of the inventive concepts are not limited thereto, and the patrol read event may include a background event performed when entering an idle mode. The patrol read operation is an example of a defense code operation performed to find a reclaim target block to be reclaimed from among a plurality of memory cell blocks and may include, for example, an operation for determining, based on a read level read from each memory cell, whether a corresponding cell block is a reclaim target memory cell. In this case, a reclaim operation refers to an operation for re-using a source memory area by moving data in the source memory area to another destination memory region and erasing the data in the source memory region. For example, effective data stored in the source memory region may be read, and the read effective data may be programmed in another destination memory region. Therefore, an address corresponding to the effective data in a mapping table may be changed from an address of a source memory region to an address of a destination memory region.

Referring to FIG. 1, the storage controller 210 may include a host interface 211, a memory interface 212, a command generator 213, and an address generator 214. The storage controller 210 may receive an operation instruction signal from the host 100 through the host interface 211 and generate commands and address information through the command generator 213 and the address generator 214 based on the operation instruction signal. The memory interface 212 of the storage controller 210 may provide generated commands and address information to the memory device 220.

According to an example embodiment, when a patrol read instruction is received from the host 100, the command generator 213 of the storage controller 210 may generate a patrol read command and provide the same to the memory device 220 in response to the patrol read instruction. Further, the address generator 214 may determine priorities of blocks to perform patrol read operations based on reliability information for the memory cell blocks and provide block address information of the memory cell blocks according to the order of the priorities to the memory device 220. For example, the address generator 214 may output block address information by determining priorities to perform patrol read operations in an ascending order of the determined reliability of the memory cell blocks. As the address generator 214 provides block address information corresponding to the memory cell block according to the priorities to the memory device 220, the memory device 220 may perform patrol read operations in the order of the priorities and provide reclaim target block information for performing reclaim operations based on the same (e.g., the order of the priorities) to the storage controller 210. Therefore, in response to an instruction to perform a reclaim operation from the host 100, the storage controller 210 may perform a reclaim operation on a memory cell block corresponding to the reclaim target block information.

The non-volatile memory of the storage device 200 may include a flash memory, and the flash memory may include a 2D NAND memory array or a 3D (or vertical) NAND (VNAND) memory array. In another example, the storage device 200 may include various other types of non-volatile memories. For example, the storage device 200 may include magnetic RAM (MRAM), spin-transfer torque MRAM, conductive bridging RAM (CBRAM), ferroelectric RAM (FeRAM), phase RAM (PRAM), resistive RAM, and various other types of memories.

The storage device 200 according to the inventive concepts may more efficiently mitigate or prevent performance degradation by primarily performing a patrol read operation on a memory cell block corresponding to a factor of poor reliability compared to a comparative example in which patrol read operations are randomly performed on memory cell blocks.

Figure 2:
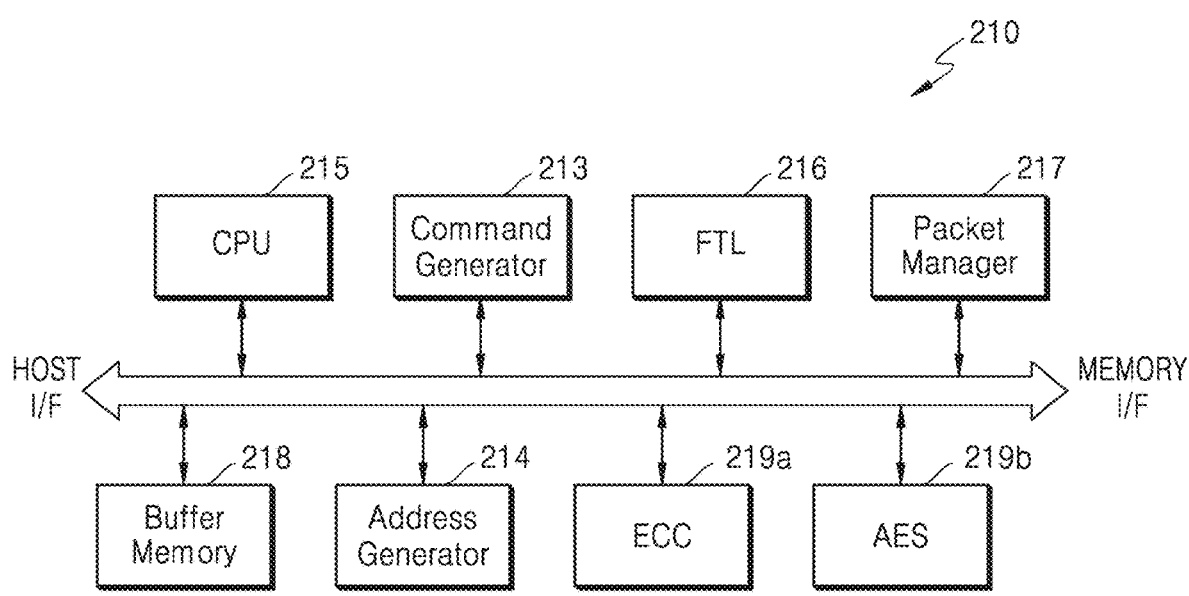
FIG. 2 is a block diagram showing a controller according to an example embodiment included in a storage device in more details.

FIG. 2 is a block diagram showing a storage controller according to an example embodiment included in a storage device in more details.

Referring to FIGS. 1 and 2, the storage controller 210 may include the host interface 211, the memory interface 212, and a central processing unit (CPU) 215. Further, the storage controller 210 may further include a flash translation layer (FTL) 216, a packet manager 217, a buffer memory 218, an error correction code (ECC) engine 219a, and an advanced encryption standard (AES) engine 219b. The storage controller 210 may further include a working memory (not shown) in which the FTL 216 is loaded, and operations for programming and reading data to and from a non-volatile memory may be controlled as the CPU 215 executes the FTL 216.

The host interface 211 may transmit and receive packets to and from the host 100. A packet transmitted from the host 100 to the host interface 211 may include a command or data to be programmed to the memory device 220, and a packet transmitted from the host interface 211 to the host 100 may include a response to the command or data read from the memory device 220. The memory interface 212 may transmit data to be programmed to the memory device 220 or may receive data read from the memory device 220. The memory interface 212 may be implemented to comply with a standard protocol like Toggle or Open NAND Flash Interface (ONFI).

The command generator 213 may generate a patrol read command in response to a patrol read instruction, and in response to a read instruction or a program instruction from the host 100, may generate a read command or a program command instructing to read data stored in the memory device 220 or program data to the memory device 220. However, the command generator 213 of the inventive concepts is not limited thereto, and the command generator 213 also may generate commands including an erase command and a reclaim command.

The address generator 214 may generate block address information corresponding to respective memory cell blocks of the memory device 220, and according to an example embodiment of the inventive concepts, may generate the block address information in an order to perform patrol read operations based on reliability information. Reliability information is information related to expected values of degradation of the memory cell blocks and may be information determined according to a life variable regarding degradation of a product over time, an environmental variable due to a poor environment, and characteristic variables related to performance. For example, the reliability information may be information determined based on retention information and endurance information, the retention information may be determined based on retention times, and the endurance information may be information determined based on a program-erase count. In other words, reliability information may be determined based on retention times and a program-erase count. According to an example embodiment, the retention information may be information regarding how long electrons may be maintained at a level to be used as information in a floating gate (FG) of each memory cell. The endurance information may be information related to the number of repetitions of program and erase operations. For example, when electrons are stored in an FG for a long time and program and erase are repeated for a large number of times, it may be determined that the reliability of a corresponding memory cell is low.

The FTL 216 may perform various functions like address mapping, wear-leveling, and garbage collection. The address mapping operation is an operation for translating a logical address received from a host into a physical address used to actually store data in the memory device 220. The wear-leveling is a technique for preventing excessive degradation of a particular block by allowing blocks in the memory device 220 to be uniformly used and may be, for example, implemented through a firmware technology for balancing erase counts of physical blocks. The garbage collection is a technique for securing usable capacity in the memory device 220 by copying effective data of a block to a new block and then erasing the old block. The packet manager 217 may generate packets according to a protocol of an interface agreed with the host 100 or may parse various information from packets received from the host 100.

Also, the buffer memory 218 may temporarily store data to be programmed to the memory device 220 or data to be read from the memory device 220. The buffer memory 218 may be a component provided in the storage controller 210, but may also be provided outside the storage controller 210. According to an example embodiment of the inventive concepts, the buffer memory 218 may store at least one of a retention time or a program-erase count corresponding to each memory cell block and may provide information corresponding to each memory cell block to the address generator 214 according to a request of the address generator 214.

The ECC engine 219a may detect and correct an error on read data read from the memory device 220. For example, the ECC engine 219a may generate parity bits regarding program data to be programmed to the memory device 220, and such parity bits may be stored in the memory device 220 together with the program data. When data is read from the memory device 220, the ECC engine 219a may correct an error of read data using parity bits read from the memory device 220 together with the read data and output error-corrected read data. The AES engine 219b may perform at least one of an encryption operation or a decryption operation for data input to the storage controller 210 using a symmetric-key algorithm.

Various elements (e.g., CPU 125, command generator 213, FTL 216, packet manager 217, address generator 214, ECC Engine 219a, and AES 219b) of the storage controller 210 may be implemented as processing circuitry (e.g., at least one processor) such as hardware including logic circuits or a hardware/software combination such as a processor executing software. For example, the processing circuitry or the processor more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. Thus, the various elements of the storage controller 210 may be functional representations with regard to various functions performed by the storage controller 210.

Figure 3:
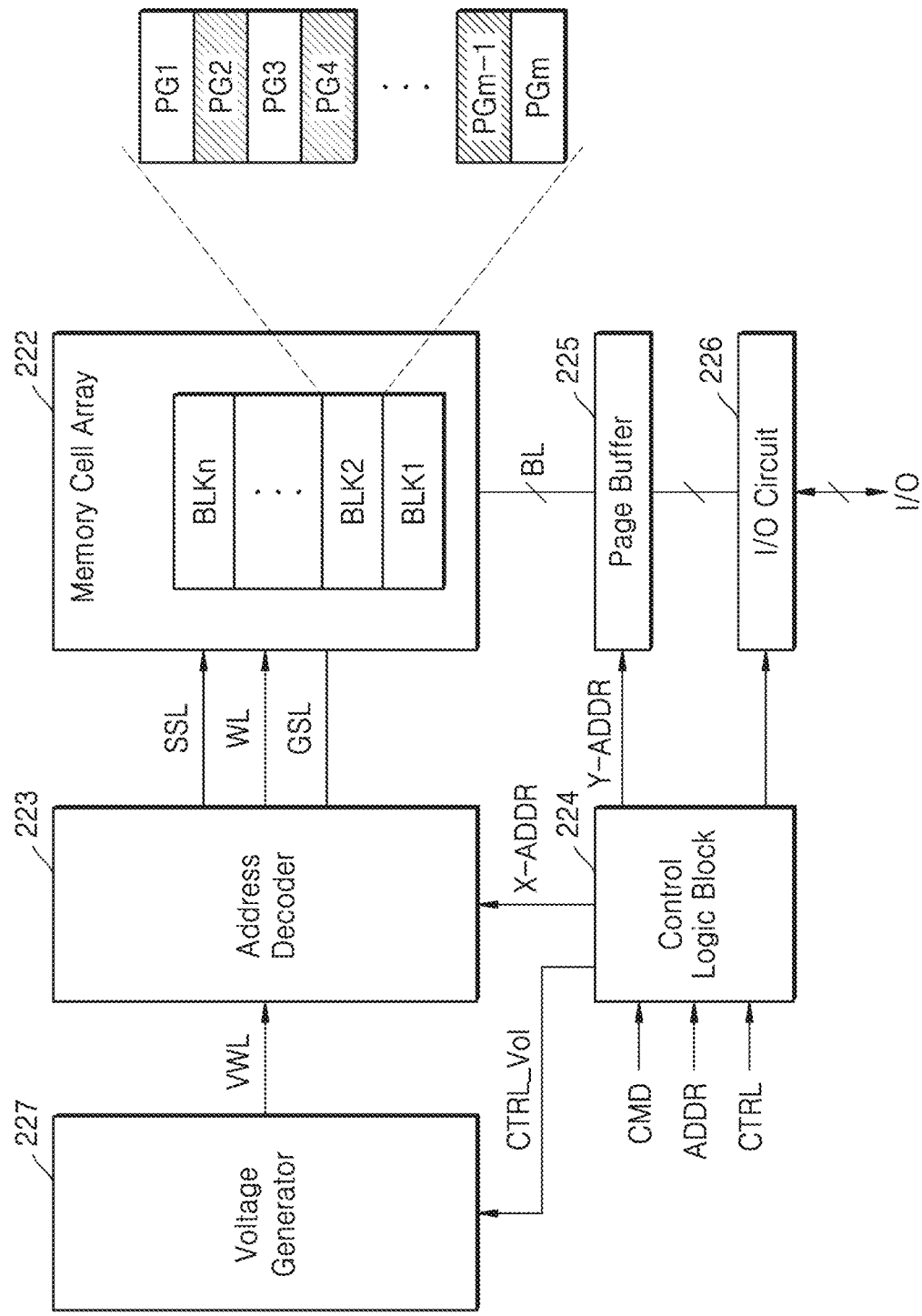
FIG. 3 is a block diagram showing a memory device according to an example embodiment included in a storage device in more details.

FIG. 3 is a block diagram showing a memory device according to an example embodiment included in a storage device in more details.

Referring to FIGS. 1 and 3, the memory device 220 may include a memory cell array 222, an address decoder 223, a control logic block 224, a page buffer 225, an input/output circuit 226, and a voltage generator 227. Although not shown, the memory device 220 may further include an input/output interface.

The memory cell array 222 may be connected to word lines WL, string select lines SSL, ground select lines GSL, and bit lines BL. The memory cell array 222 may be connected to the address decoder 223 through the word lines WL, the string select lines SSL, and the ground select lines GSL and may be connected to the page buffer 225 through the bit lines BL. The memory cell array 222 may include a plurality of memory blocks BLK1 to BLKn.

The memory blocks BLK1 to BLKn may each include a plurality of memory cells and a plurality of select transistors.

Memory cells may be connected to the word lines WL, and select transistors may be connected to the string select lines SSL or the ground select lines GSL.

The memory cells of each of the memory blocks BLK1 to BLKn may be a single level cells (SLC) each storing 1-bit data or multi-level cells (MLC) each storing 2-bit data or greater. However, the inventive concepts are not limited thereto, and the memory cells may also be triple level cells (TLC) and quad level cells (QLC).

The memory blocks BLK1 to BLKn may each include a plurality of pages PG1 to PGm. Each of the pages PG1 to PGm may correspond to a unit for programming or reading data in one memory block. In an example embodiment, memory cells included in each of the pages PG1 to PGm may be connected to the same word line.

The address decoder 223 may select one of a plurality of memory blocks BLK1 to BLKn of the memory cell array 222, may select one of the word lines WL of a selected memory block, and may select one of the select lines SSL.

The control logic block 224 (or a control logic circuit) may output various control signals for performing program, read, and erase operations on the memory cell array 222 based on a command CMD, address ADDR, and a control signal CTRL. The control logic block 224 may provide a row address X-ADDR to the address decoder 223, provide a column address Y-ADDR to the page buffer 225, and provide a voltage control signal CTRL_Vol to the voltage generator 227.

The control logic block 224 may perform an erase operation on each of the memory blocks BLK1 to BLKn as a unit. The control logic block 224 may perform a read operation and a program operation on each of the pages PG1 to PGm as a unit.

In an example embodiment, the control logic block 224 may perform a patrol read operation on each of the memory blocks BLK1 to BLKn as a unit. For example, the control logic block 224 may receive a series of block address information corresponding to respective memory cell blocks and perform patrol read operations on the corresponding memory cell blocks in the order that block address information is received. For example, when the control logic block 224 sequentially receives block address information corresponding to first, second, and third memory cell blocks, patrol read operations may be performed in the order of the first, second, and third memory cell blocks.

The page buffer 225 may operate as a program driver or a sense amplifier depending on an operation mode. During a read operation, the page buffer 225 may sense a bit line BL of a selected memory cell under the control of the control logic block 224. Sensed data may be stored in latches provided in the page buffer 225. The page buffer 225 may dump data stored in the latches to the input/output circuit 226 under the control of the control logic block 224.

The input/output circuit 226 may temporarily store the command CMD, the address ADDR, the control signal CTRL, and the data DATA provided from the outside of the memory device 220 through an input/output line I/O. The input/output circuit 226 may temporarily store read data of data read from the memory device 220 and output the read data to the outside through the input/output line I/O at a designated time point.

The voltage generator 227 may generate various types of voltages for performing a program operation, a read operation, and an erase operation on the memory cell array 222 based on the voltage control signal CTRL_Vol. For example, the voltage generator 227 may generate a word line voltage VWL, e.g., a program voltage, a read voltage, a pass voltage, an erase verify voltage, or a program verify voltage. Also, the voltage generator 227 may generate a string select line voltage and a ground select line voltage based on the voltage control signal CTRL_Vol. Also, the voltage generator 227 may generate an erase voltage to be provided to the memory cell array 122.

Figure 4:
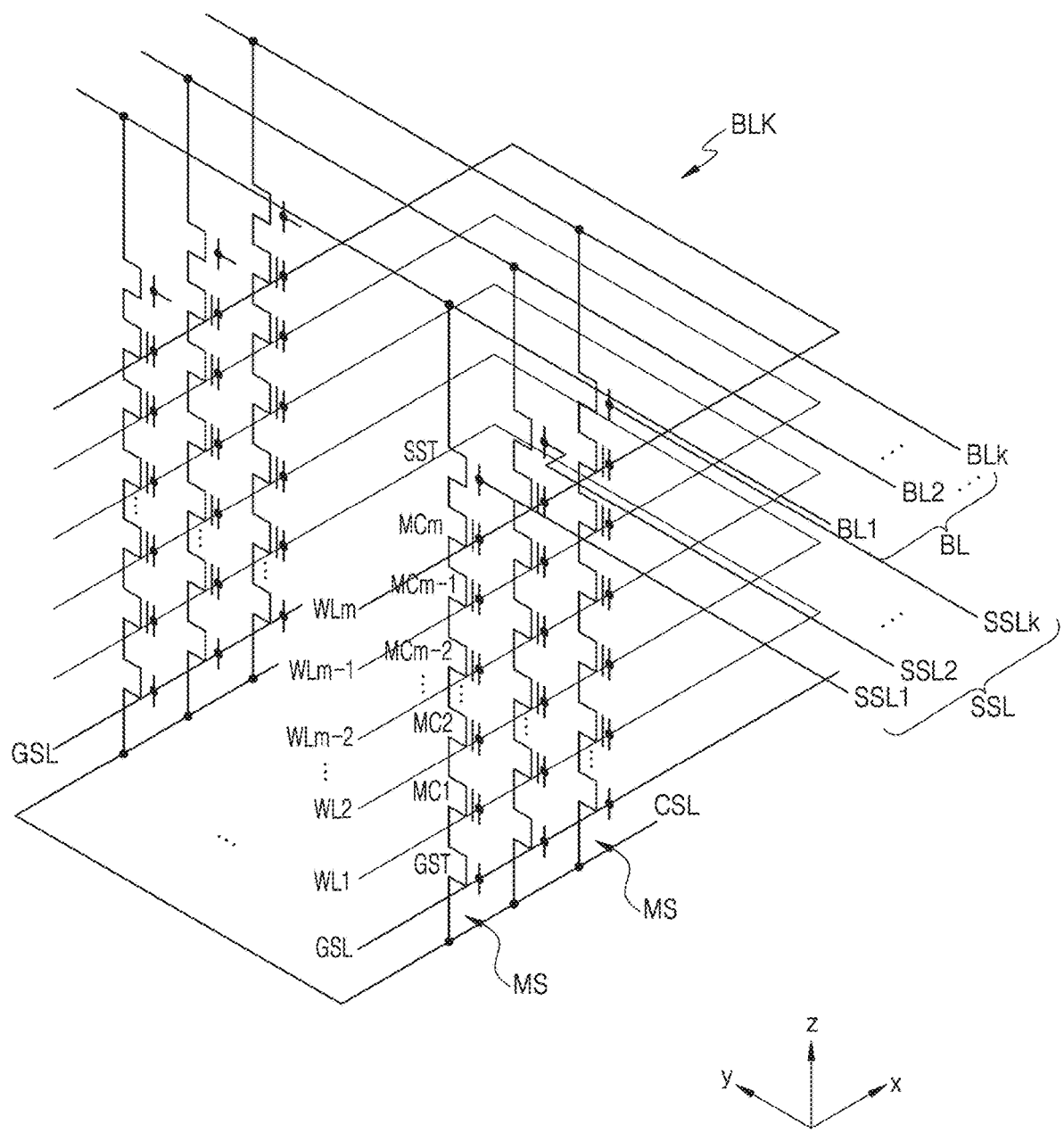
FIG. 4 is an equivalent circuit diagram of a memory cell block of a memory cell array included in a memory device according to an example embodiment.

FIG. 4 is an equivalent circuit diagram of a memory cell block of a memory cell array included in a memory device according to an example embodiment.

FIG. 4 is an equivalent circuit diagram of a vertical NAND flash memory device having a vertical channel structure formed on a substrate. Referring to FIG. 4, a memory block BLK included in a memory cell array may include a plurality of memory cell strings MS. The memory block BLK may include a plurality of bit lines BL: BL1 to BLk, a plurality of word lines WL: WL1 to WLn, a plurality of string select lines SSL: SSL1 to SSLk, at least one ground select line GSL, and a common source line CSL. A plurality of memory cell strings MS may be formed between the bit lines BL: BL1 to BLk and the common source line CSL.

The memory cell strings MS may each include a string select transistor SST, a ground select transistor GST, and a plurality of memory cells MC1 to MCm. A drain region of the string select transistor SST may be connected to the bit lines BL, and a source region of the ground select transistor GST may be connected to the common source line CSL. The common source line CSL may be a region in which source regions of a plurality of ground select transistors GST are connected in common.

To be controlled independently from one another, the string select transistors SST included in the memory cell strings MS may be connected to different string select lines from one another. For example, the string select transistor SST may be connected to a string select line (e.g., one from among SSL1, SSL2, and SSL3).

The ground select transistor GST may be connected to the ground select line GSL. In an example embodiment, different ground select transistors GST included in the memory cell strings MS of the memory block BLK may be connected to the same ground select line GSL. However, the inventive concepts are not limited thereto, and the different ground select transistors GST may be connected to different ground select lines GSL, respectively.

The memory cells MC1 to MCm constituting the memory cell strings MS in the memory block BLK may have a structure connected in series in the Z-axis direction perpendicular to the main surface of a substrate. In the memory block BLK, the word lines WL may extend in the X-axis direction, and the bit lines BL may extend in the Y-axis direction.

The memory cells MC1 to MCm may be connected to the word lines WL, respectively. Each of the memory cells MC1 to MCm may store one bit of data or two or more bits of data. In an example embodiment, some of the memory cells MC1 to MCm may be an SLC, and some other ones of the memory cells MC1 to MCm may be MLC. For example, from among the memory cells MC1 to MCm, first memory cells MC1 formed in the bottommost layer and connected to a first word line WL1 may be an SLC. Also, for example, from among the memory cells MC1 to MCm, m-th memory cells MCm formed in the topmost layer and connected to an m-th word line WLm may be SLC. From among the memory cells MC1 to MCm, memory cells formed in the topmost layer and the bottommost layer, e.g., the first memory cells MC1 and the m-th memory cells MCm, may be formed as an SLC, thereby improving data reliability.

In the memory cell strings MS, a program and a read operation may be performed page-by-page. A page may be a row of memory cells connected to one word line. The memory cells MC1 to MCm may be selected page-by-page by each of the word lines WL.

Figure 5:
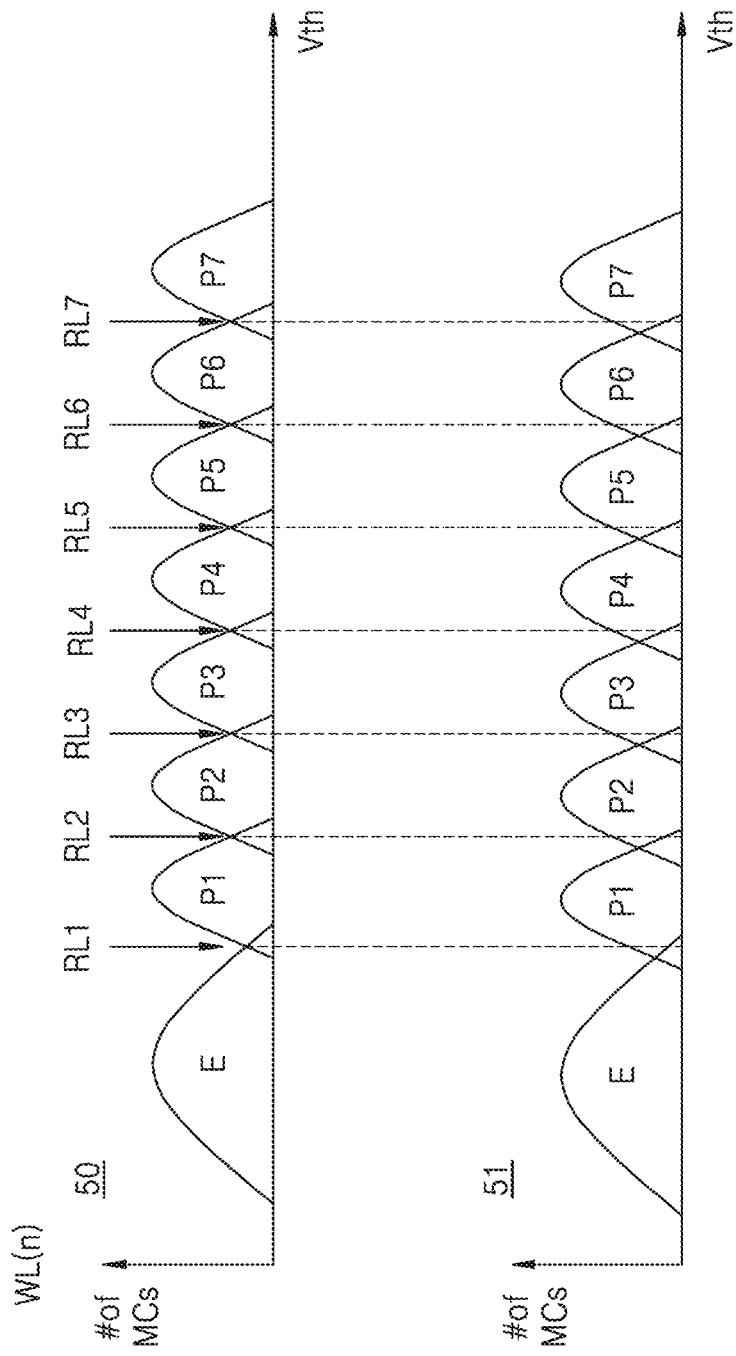
FIG. 5 is a graph showing a threshold voltage distribution of a memory cell in which degradation has occurred according to an example embodiment.

FIG. 5 is a graph showing a threshold voltage distribution of a memory cell in which degradation has occurred according to an example embodiment.

Referring to FIG. 5, a distribution shape of a plurality of memory cells connected to a word line may be changed from an initial distribution 50 to a modified distribution 51 due to variations. In the initial distribution 50 and the modified distribution 51, the horizontal axis may represent a threshold voltage Vth, and the vertical axis may represent the number of memory cells. In other words, the initial distribution 50 and the modified distribution 51 may represent distributions of memory cells according to the threshold voltage Vth, respectively.

The initial distribution 50 may be a distribution of memory cells immediately after a program operation for the memory cells or within a desired (or alternatively, predetermined) time after completion of a program operation. According to an example embodiment, a control logic may determine a plurality of default read voltage levels RL1 to RL7 for respective program states P1 to P7, based on valleys each between two program states adjacent to each other. For example, the control logic may determine a first default read voltage level RL1 according to a valley between an erase state E and a first program state P1. Also, the control logic may determine a seventh default read voltage level RL7 according to a valley between a sixth program state P6 and a seventh program state P7.

The modified distribution 51 may be a distribution of memory cells after a desired (or alternatively, predetermined) time after a program operation for the memory cells. Memory cells respectively programmed to the erase state E and the first to seventh program states P1 to P7 may have the modified distribution 51 in which a threshold voltage changes compared to the initial distribution 50 due to external stimulation or wear. For example, when time has elapsed after a program operation, that is, when a retention time increases, charges stored in charge trapping layers of the memory cells may be leaked to a substrate, and thus, the threshold voltages of the memory cells may decrease. In another example, the threshold voltages of memory cells may increase due to a read interruption caused by read operations for adjacent memory cells. In another example, the threshold voltages of the memory cells may be changed due to a temperature difference during a program operation and a read operation.

The retention time is a time elapsed at a high temperature or at room temperature after a program operation is performed on a memory cell and may also be referred to as a data retention time. As the retention time increases, charge loss in a memory cell increases, and the charge loss rate may vary from one word line to another. Specifically, electrons trapped in a charge trapping layer through a program operation may be reduced due to rearrangement over time, for example, various phenomena like loss to a channel region and transfer of the electrons through the charge trapping layer. Accordingly, the threshold voltages of memory cells decreases, and as a result, drooping and spreading may occur for a distribution according to the threshold voltages of the memory cells. At this time, the amounts the threshold voltages decrease may vary from one word line to another.

The read interruption refers to a phenomenon in which, due to a result of a reading operation on memory cells connected to a selected word line, the distribution of memory cells connected to an adjacent word line changes. For example, when a program state corresponding to a high threshold voltage is programmed to memory cells connected to a selected word line, the threshold voltage of memory cells connected to an adjacent word line may increase, wherein the amounts the threshold voltages increase may vary from each word line to another according to distances from the selected word line.

For example, the threshold voltages of memory cells programmed to the erase state E and the first program state P1, respectively, may decrease, and thus a valley between the erase state E and the first program state P1 may be shifted in a negative direction. Therefore, when a read operation is performed using a first default read voltage level RL1, a read error may occur for some of the memory cells programmed to the first program state P1. Here, the read error may correspond to a case in which the number of fail bits in the read data is equal to or greater than a reference number correctable by ECC. At this time, the read error may be removed by changing an optimal read voltage for the first program state P1 to a first corrected read voltage level corresponding to a shifted valley between the erase state E and the first program state P1.

It is described above that the read error according to the initial distribution 50 and the modified distribution 51 occurs on the same word line due to an increase in a retention time or a temperature difference during programming/reading of adjacent memory cells. However, although data of memory cells needs to be read at different actual read voltage levels for word lines connected to different chips or blocks due to process differences, a read error may occur even when memory cells of different chips or blocks are read at one pre-set default read voltage level.

Therefore, according to an example embodiment of the inventive concepts, a patrol read operation is performed on each memory cell block to determine whether a read voltage level for a corresponding memory cell block has been shifted, wherein the patrol read operation may be performed according to priorities determined based on reliability information.

Figure 6:
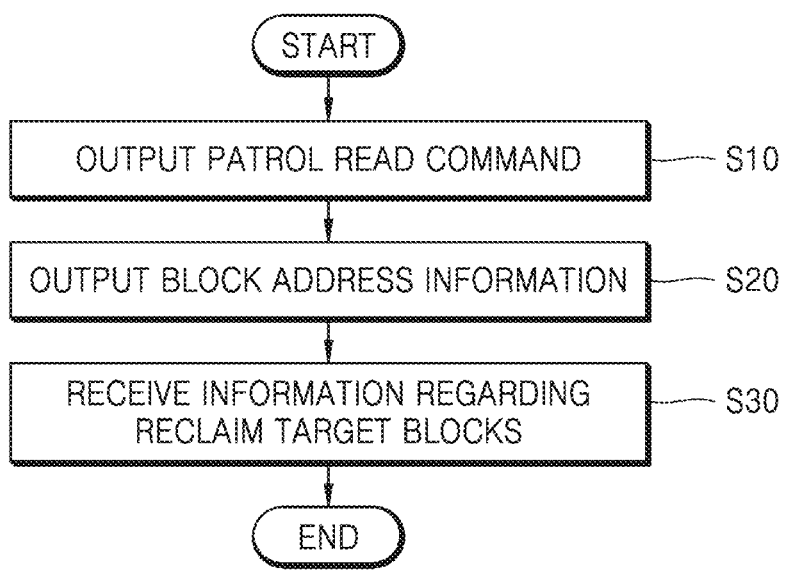
FIG. 6 is a flowchart of a method of operating a controller, according to an example embodiment of the inventive concepts.

FIG. 6 is a flowchart of a method of operating the storage controller 210, according to an example embodiment of the inventive concepts.

Referring to FIG. 6, the storage controller 210 may receive reclaim target block information by providing a patrol read command and block address information of memory cell blocks to perform a patrol read operation on the memory device 220. In operation S10, the storage controller 210 may output a patrol read command when a request for performing a patrol read operation from the host 100 is received or it is detected that the storage device 200 enters an idle mode. For example, in response to that the storage device 200 enters the idle mode, the storage controller 210 may provide a patrol read command to the memory device 220. The idle mode may be a mode corresponding to a standby mode of the storage device 200 in which the storage device 200 is available without an actual operation. By performing a patrol read operation in response to a case where the storage device 200 enters the idle mode, a reclaim operation that optimizes memory cells may be performed when operations for programming, reading, or erasing data are not performed.

In operation S20, the storage controller 210 may output block address information for performing patrol read operations in an order determined based on the reliability information. The reliability information is information related to the reliability of data stored in memory cells, and the reliability of data may be information related to whether a logic level of data programmed as a threshold voltage level of a corresponding memory cell is shifted is reliable. Therefore, for example, because the threshold voltage value of a memory cell to which data has been programmed a long time ago is very likely shifted, the storage device 200 may determine that the reliability of a memory cell block including the corresponding memory cell is low.

According to an example embodiment of the inventive concepts, the storage controller 210 may set priorities of memory cell blocks by performing patrol read operations in an ascending order of reliabilities of the memory cell blocks based on the reliability information. Accordingly, the storage controller 210 may set the priority of memory cell blocks to perform patrol read operations based on the reliability information, and thus the patrol read operations may be more efficiently performed as compared to the comparative example in which patrol read operations are randomly performed on memory cell blocks.

In operation S30, the storage controller 210 may receive reclaim target block information regarding whether a corresponding memory cell block is a reclaim target block to which a reclaim operation is to be performed as a result of performing a patrol read operation. The storage controller 210 may receive the reclaim target block information and store the same in the page buffer and, in response to a request to perform a reclaim operation, the storage controller 210 may load the reclaim target block information from the page buffer and perform the reclaim operation.

FIG. 7 is a table showing reliability information regarding a memory cell block according to an example embodiment.

Referring to FIG. 7, the storage device 200 may store at least one of a program-erase count PE# or a retention time for each memory cell block as reliability information regarding a corresponding memory cell block. According to an example embodiment, the memory device 220 may manage a portion of a region to store data as a user region for storing user data and at least a portion of the remaining region to store data excluding the user region as a meta region for storing information regarding memory cell blocks, wherein the memory device 220 may store reliability information in the meta region. However, the inventive concepts are not limited thereto, and the reliability information may be stored in the page buffer of the storage controller 210.

Referring to FIG. 7, the storage device 200 may store respective retention times for nine memory cell blocks in a recent program order PG. The recent program order PG may be an order of recent times at which data has been programmed to a corresponding memory cell block, and the earliest recent program order PG may indicate the longest time that has elapsed after data was written. The storage device 200 may determine the recent program order PG of each memory cell block by counting the number of program cycles after the latest data is programmed.

For example, according to FIG. 7, because the recent program order PG of the first memory cell block BLK1 is the first and the recent program order PG of an eighth memory cell block BLK8 is the last, the reliability information may indicate that, from among nine memory cell blocks, the longest time has elapsed since the latest data is programmed to the first memory cell block BLK1 and the shortest time has elapsed since the latest data is programmed to the eighth memory cell block BLK8. In other words, since the retention time of the first memory cell block BLK1 is the longest and the retention time of the eighth memory cell block BLK8 is the shortest, the reliability of the first memory cell block BLK1 may be lower than the reliability of the eighth memory cell block BLK8.

Also, the storage device 200 may store the program-erase count PE# for each of the memory cell blocks. The storage device 200 may generate the program-erase count PE# based on the number of times that program-erase cycles have been repeated by counting programming and erasing of data to a memory cell block after data is initially programmed to the corresponding memory cell block as a single count.

Because carriers in the floating gate have a characteristic of returning to a stable state when the carriers are in an unstable state, when the memory device 220 is left in a programmed state for a long time, the distribution of the erase state shifts to the right and the distribution of the program state shifts to left as shown in FIG. 5, and thus a retention time in reliability information may be highly correlated to the reliability of data. Also, as the number of programs and erases increases, a tunnel oxide of a memory cell is degraded, and the performance of program and erase may be deteriorated. Therefore, even when a program operation or an erase operation is performed, a memory cell block that is programmed and erased for a large number of times may have low reliability due to low mobility of electrons.

According to an example embodiment of the inventive concepts, the retention time and the program-erase count PE# are exemplified as factors of the reliability information that affect the reliability of a memory cell block. However, the inventive concepts are not limited thereto, and the storage device 200 may utilize information regarding at least some of life variables, environment variables, and performance-related characteristic variables as factors of the reliability information.

FIGS. 8A and 8B are tables showing priorities to perform a patrol read operation based on reliability information according to some example embodiments of the inventive concepts.

Referring to FIG. 8A, the storage device 200 may determine priorities to output block address information based on the program-erase count PE#. For example, a program-erase count PE# of a seventh memory cell block BLK7 is 210 times, and the number of times that program-erase operations are performed on the seventh memory cell block BLK7 is the largest from among the 9 memory cell blocks. On the other hand, a program-erase count PE# of a ninth memory cell block BLK9 is 10 times, and the number of times that program-erase operations are performed on the ninth memory cell block BLK9 is the smallest from among the 9 memory cell blocks. Therefore, because the reliability of the seventh memory cell block BLK7 may be the lowest and the reliability of the ninth memory cell block BLK9 may be the highest, the storage device 200 may set the highest priority for the seventh memory cell block BLK7 and the lowest priority for the ninth memory cell block BLK9 when a patrol read operation is to be performed. In other words, the storage controller 210 may output block address information regarding the seventh memory cell block BLK7 first along with a patrol read command and may output block address information regarding the ninth memory cell block BLK9 last.

Referring to FIG. 8B, the storage device 200 may determine priorities to output block address information based on the recent program order PG. For example, the recent program order PG of the first memory cell block BLK1 may be the first. In other words, from among 9 memory cell blocks, the longest time may have elapsed since the latest data is programmed to the first memory cell block BLK1, and thus the first memory cell block BLK1 may be the memory cell block with the longest retention time. In contrast, the shortest time may have elapsed since the latest data is programmed to an eighth memory cell block BLK8, and thus the eighth memory cell block BLK8 may be the memory cell block with the shortest retention time. Therefore, because the reliability of the first memory cell block BLK1 may be the lowest and the reliability of the eighth memory cell block BLK8 may be the highest, the storage device 200 may set the highest priority for the first memory cell block BLK1 and the lowest priority for the eighth memory cell block BLK8 when a patrol read operation is to be performed. In other words, the storage controller 210 may output block address information regarding the first memory cell block BLK1 first along with a patrol read command and may output block address information regarding the eighth memory cell block BLK8 last.

Figure 9:
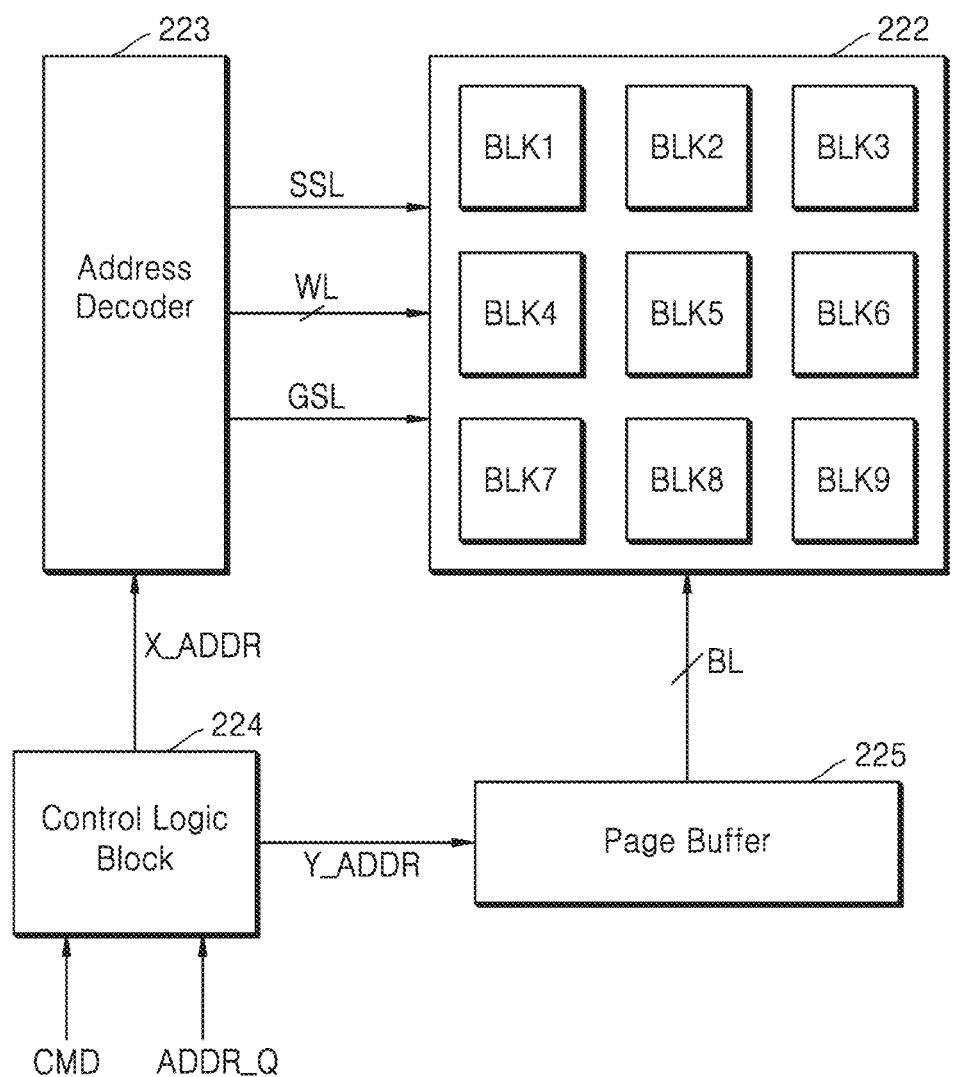
FIG. 9 is a block diagram showing a memory device that receives block address information according to priorities.

FIG. 9 is a block diagram showing the memory device 220 that receives block address information according to priorities.

Referring to FIG. 9, the memory device 220 may receive a patrol read command CMD and a series of block address information ADDR_Q corresponding to memory cell blocks and may perform a patrol read operation on memory cell blocks corresponding to the series of block address information ADDR_Q, respectively. The series of block address information ADDR_Q may be block address information arranged in a priority order determined according to any one the tables of FIGS. 8A and 8B. When the memory device 220 receives the series of block address information ADDR_Q according to priorities determined according to the table of FIG. 8A, the memory device 220 may receive block address information corresponding to a block 7, a block 4, a block 5, a block 8, a block 6, a block 3, a block 2, a block 1, and a block 9 in the order stated.

The control logic block 224 of the memory device 220 may select a memory cell block to perform a patrol read operation based on received block address information and provide a row address X_ADDR of a selected memory cell block to the address decoder 223 and provide a column address Y_ADDR to the page buffer 225. The address decoder 223 that received the row address X_ADDR may apply voltages for performing a patrol read operation to string select lines SSL, word lines WL, and ground select lines GSL included in the selected memory cell block. Also, the page buffer 225 that received the column address Y_ADDR may apply voltages for performing a patrol read operation to bit lines included in the selected memory cell block. The memory device 220 may determine whether the selected memory cell block is a memory cell block needing a reclaim operation by performing a patrol read operation on the selected memory cell block and may provide a result of the determination to the storage controller 210 or the host 100.

Figure 10:
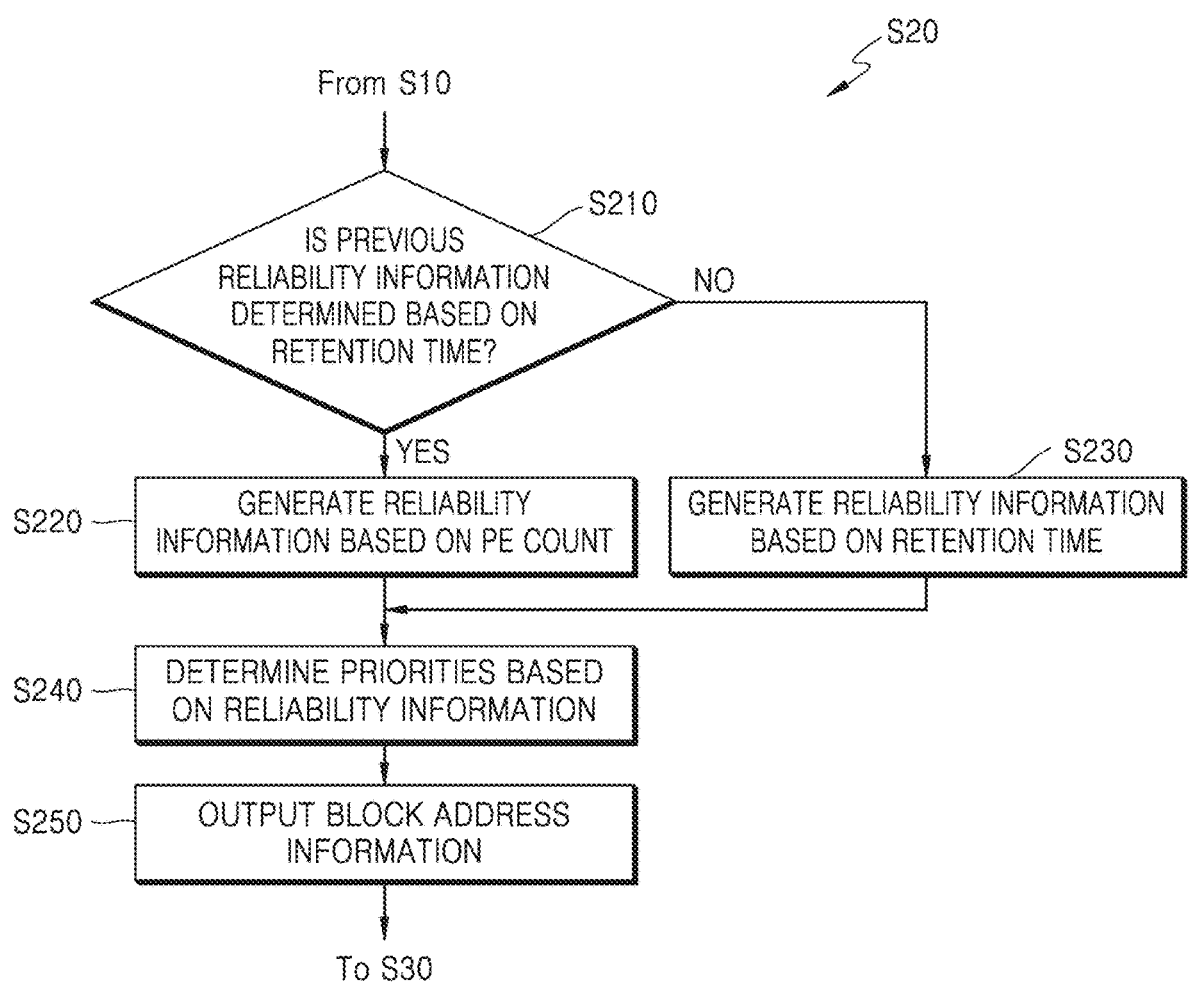
FIG. 10 is a flowchart of a method of updating reliability information every time an idle mode is entered according to an example embodiment.
Figure 11:
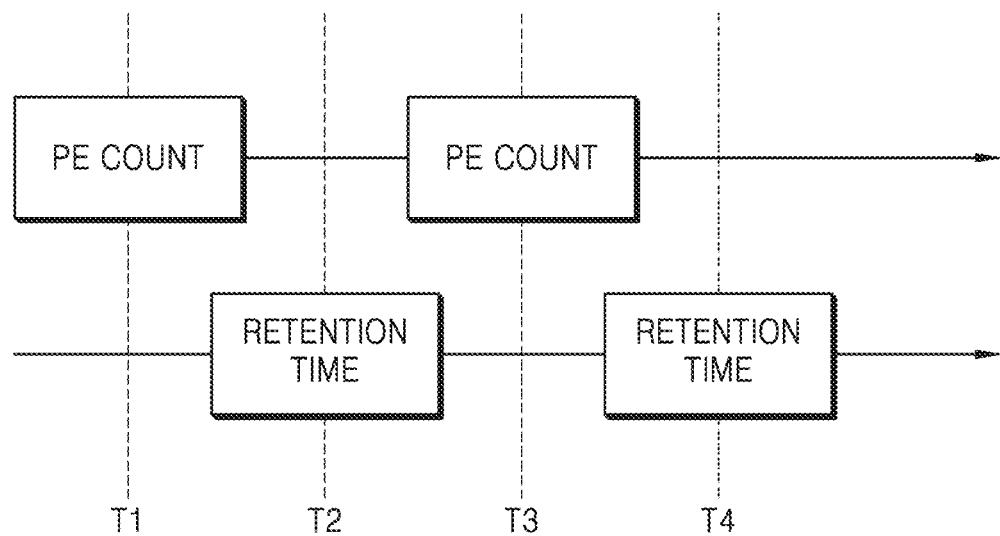
FIG. 11 is a timing diagram of a method of updating reliability information every time the idle mode is entered.

FIGS. 10 and 11 are diagrams for describing a method of updating reliability information, according to an example embodiment. FIG. 10 is a flowchart of a method of updating reliability information, and FIG. 11 is a timing diagram of the method of updating reliability information. Note that the timing diagram provided herein is not necessarily drawn to scale.

Referring to FIG. 10, the storage device 200 may determine which of a retention time and a program-erase count is to be used to generate reliability information based on information used when previous reliability information has been generated. In other words, as in the example embodiment of FIG. 11, the storage device 200 of the inventive concepts may alternately use retention times and program-erase counts to generate reliability information.

In operation S210, the storage device 200 may determine whether previous reliability information has been generated based on a retention time. In operation S220, when it is determined that the previous reliability information has been generated based on the retention time, the storage device 200 may generate reliability information based on the program-erase count. Otherwise, in operation S230, when it is determined that the previous reliability information has not been generated based on the retention time and has been generated, for example, based on a program-erase count, the storage device 200 may update the reliability information based on the retention time. In other words, according to the example embodiment of FIG. 10, when a patrol read operation is periodically performed, the storage device 200 may generate reliability information based on the program-erase count at a $2n$-th (n is a natural number) turn and generate reliability information based on the retention time at a $2n+1$-th turn.

In operation S240, the storage device 200 may determine priorities of patrol read operations for memory cell blocks based on the reliability information. For example, when the storage device 200 generates the reliability information based on the retention time, the priorities of patrol read operations may be determined in the descending order of the retention times of the memory cell blocks. When the storage device 200 generates the reliability information based on the program-erase count, the priorities of patrol read operations may be determined in the descending order of the program-erase counts of the memory cell blocks. The example embodiments in which the storage device 200 determines the priorities have been described above with reference to FIGS. 8A and 8B, and thus detailed descriptions thereof will be omitted.

In operation S250, the storage device 200 may generate block address information according to determined priorities and output the block address information to the memory device 220. After the block address information and a patrol read command are received, the memory device 220 may perform patrol read operations on memory cell blocks corresponding to the block address information, and, in operation S30, the storage device 200 may determine whether memory cell blocks to which the patrol read operations are performed are reclaim target blocks.

According to the embodiment of FIG. 10, because the storage device 200 may generate reliability information based on information other than information used to generate previous reliability information, the storage device 200 may efficiently perform a patrol read operation.

Referring to FIG. 11, when the storage device 200 performs a patrol read operation according to the embodiment of FIG. 10, information regarding a retention time or a program-erase count may be received to update reliability information. Time points T1 to T4 of FIG. 11 may indicate time points at which the storage device 200 enters the idle mode. The storage device 200 may receive reliability information based on a program-erase count at a time point T1 and may receive reliability information based on a retention time at a time point T2. In other words, the storage device 200 may update reliability information based on information different from information used to enter a previous idle mode.

Figure 12:
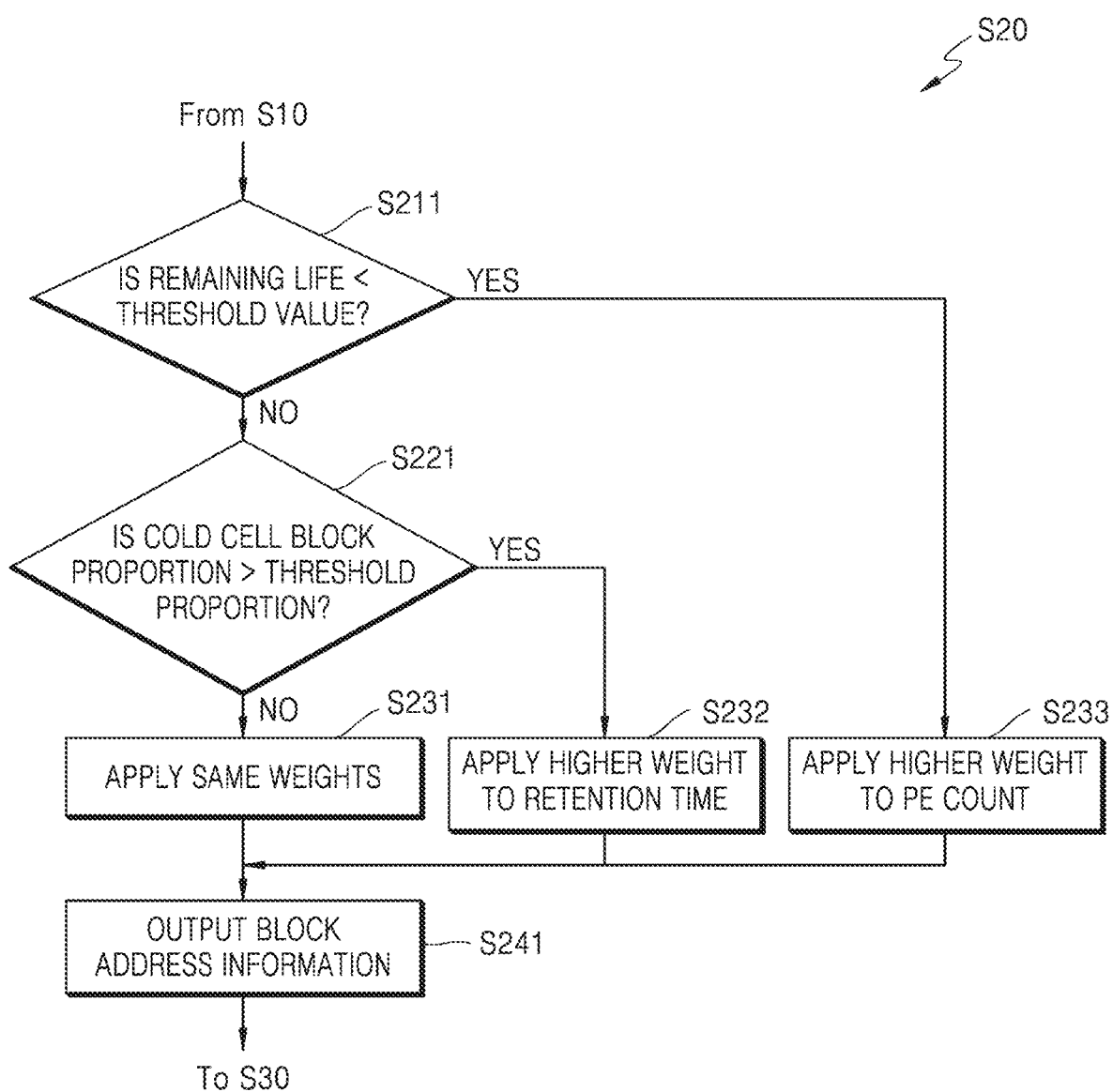
FIG. 12 is a flowchart of a method of determining which of a retention time and a program-erase count is to be used as information for updating reliability information every time an idle mode is entered.

FIG. 12 is a flowchart of a method of determining which of a retention time and a program-erase count is to be used as information for updating reliability information every time an idle mode is entered.

Referring to FIG. 12, when the storage device 200 determines priorities of memory cell blocks to perform patrol read operations, the storage device 200 may determine which of a retention time and a program-erase count is to be applied with a higher weight based on a remaining life and a proportion of cold cell blocks. A weight may indicate a frequency of utilization of a retention time and a program-erase count for a plurality of reliability information updates in the case of performing patrol read operations for a plurality of number of times while the storage device 200 is operating. However, the inventive concepts are not limited thereto, and the weight may also indicate degrees of reflection of a retention time and a program-erase count in the generation of reliability information once.

In operation S211, the storage device 200 may determine whether the remaining life of the storage device 200 is less than a threshold value. The remaining life of the storage device 200 may be a value obtained by subtracting an operation period from an expected life of the storage device 200. The shorter the remaining life is, the longer the storage device 200 may have operated. Therefore, the shorter the remaining life is, the higher a proportion of memory cell blocks to which the program-erase operation has been performed intensively from among all memory cell blocks may be. Therefore, in operation S233, when the storage device 200 determines that the remaining life thereof is less than the threshold value, a higher weight may be applied to the program-erase count.

In operation S221, when the storage device 200 determines that the remaining life of the storage device 200 is equal to or greater than the threshold value, it may be determined whether a proportion of cold cell blocks is equal to or greater than a threshold proportion. A cold cell block is a memory cell block that is determined as having been accessed for a small number of times from among memory cell blocks. The fewer the number of accesses is, the more likely the retention time may increase. Therefore, in operation S232, when the storage device 200 determines that a proportion of cold cell blocks from among the memory cell blocks of the memory device 220 is high, the storage device 200 may apply a higher weight to the retention time. In operation S231, when the proportion of cold cell blocks is less than the threshold proportion and the remaining life of the storage device 200 is equal to or greater than the threshold value (e.g., the memory cell blocks are accessed evenly), a variation in retention times may be small and thus the storage device 200 may apply the same weight to the program-erase count and the retention time.

In operation S241, the storage device 200 may output block address information based on at least one of the retention time or the program-erase count. The memory device 220 may perform a patrol read operation by receiving output block address information.

According to an example embodiment, the higher the priority to perform a patrol read operation is, the earlier the storage device 200 may perform the patrol read operation. However, the inventive concepts are not limited thereto. For example, the higher the priority to perform a patrol read operation is, the more patrol read operations the storage device 200 may perform. As an example, the storage device 200 may perform patrol read operations for a plurality of number of times on some memory cell blocks with high priorities. Because it may be determined whether the corresponding memory cell blocks are memory cell blocks that need to be reclaimed as a result of performing the patrol read operations for a number of times, reclaim target memory cell blocks may be detected more accurately.

Figure 13:
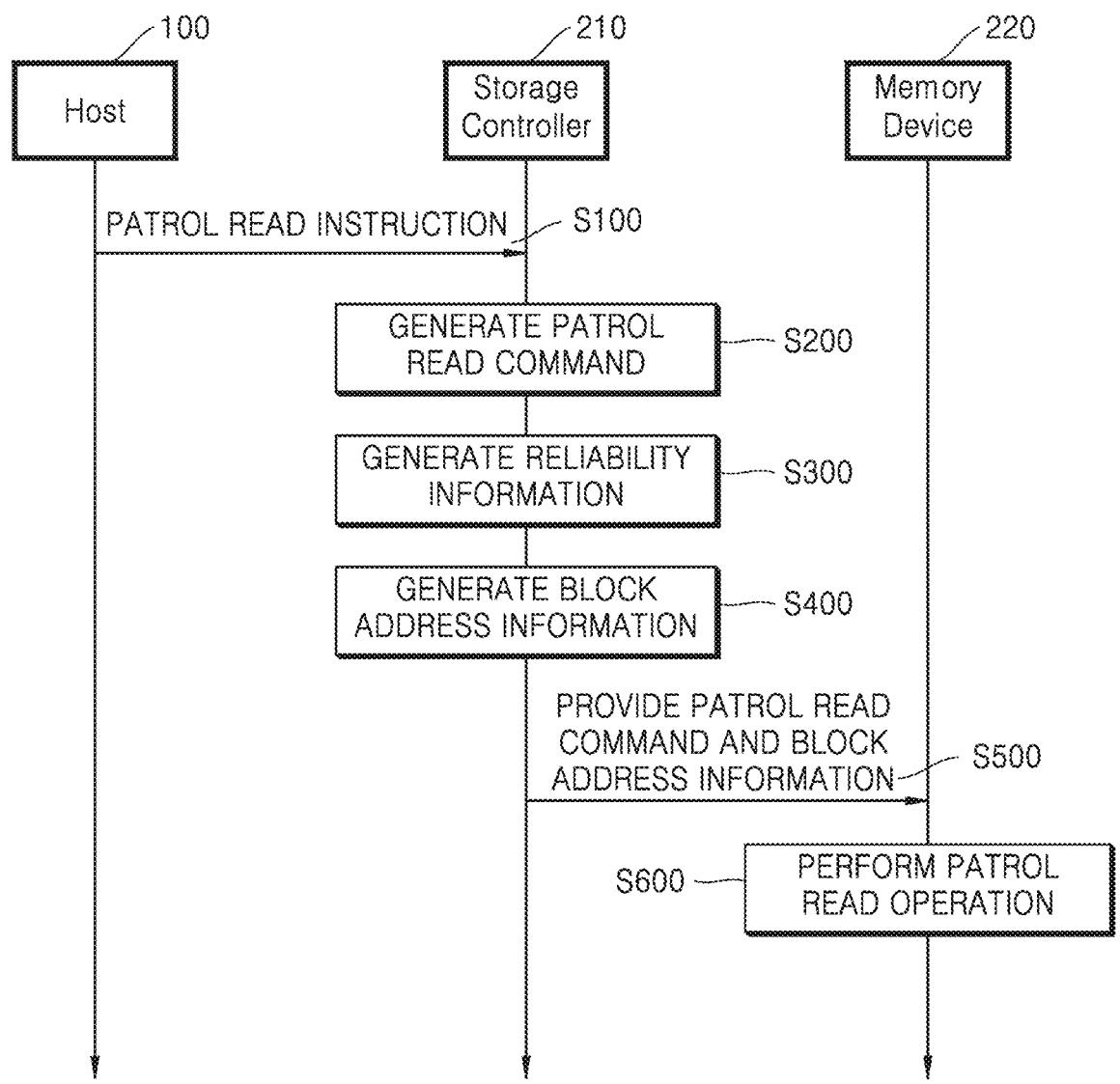
FIG. 13 is a flowchart of a method of operating a storage system in which a controller generates block address information according to an example embodiment.
Figure 14:
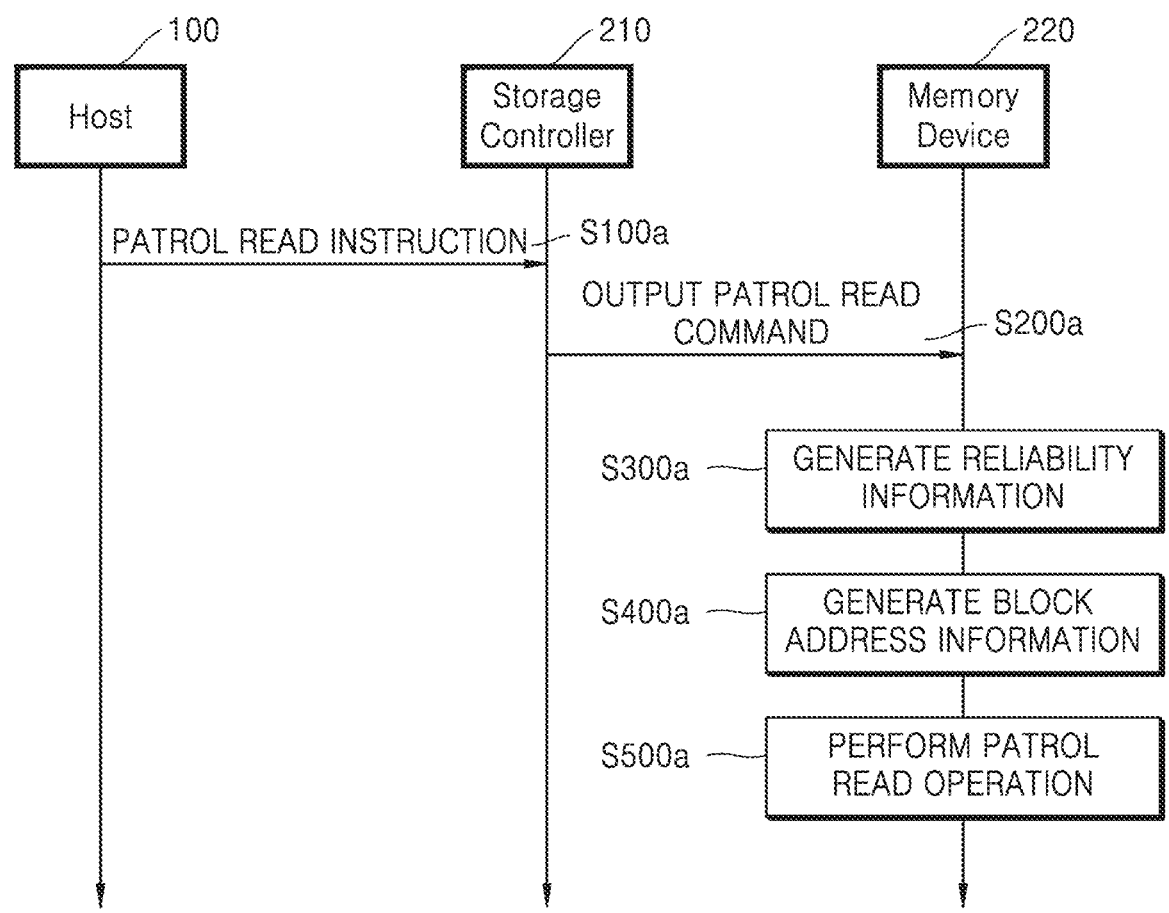
FIG. 14 is a flowchart of a method of operating a storage system in which a memory device generates block address information according to an example embodiment.

FIG. 13 is a flowchart of a method of operating a storage system in which the storage controller 210 generates block address information according to an example embodiment, and FIG. 14 is a flowchart of a method of operating a storage system in which the memory device 220 generates block address information according to an example embodiment.

Referring to FIG. 13, the storage controller 210 may determine priorities of memory cell blocks to perform patrol read operations by generating reliability information. In operation S100, the storage controller 210 may receive an instruction from the host 100 to perform a patrol read operation. For example, the instruction to perform a patrol read operation may refer to a signal instructing the storage device 200 to enter the idle mode. In operation S200, the storage controller 210 may generate a patrol read command in response to the instruction to perform a patrol read operation from the host 100. In operation S300, the storage controller 210 may generate reliability information based on at least one of a retention time or a program-erase count, and in operation S400, the storage controller 210 may generate block address information based on the reliability information.

In operation S500, the storage controller 210 may provide the patrol read command and the block address information to the memory device 220. The block address information may be information corresponding to address information of memory cell blocks to perform patrol read operations, and the storage controller 210 may provide the block address information to the memory device 220 in the order of priorities determined based on the reliability information. In operation S600, the memory device 220 may sequentially perform patrol read operations on corresponding memory cell blocks in response to the patrol read command and the block address information.

Referring to FIG. 14, as the patrol read command is received from the storage controller 210 in operation S200a in response to a patrol read instruction from the host 100 in operation S100a, the memory device 220 may generate reliability information, based on at least one of a retention times or program-erase counts regarding the respective memory cell blocks stored in the page buffer in operation S300a, generate the block address information for performing patrol read operations based on the reliability information in operation S400a, and perform a patrol read operation in operation S500a. Compared with the example embodiment of FIG. 13, in the example embodiment of FIG. 14, because the memory device 220 generates the reliability information and the block address information in operations S300a and 400a, patrol read operations may be performed through fewer signal exchanges with the storage controller 210 of the storage device 200.

While the inventive concepts have been particularly shown and described with reference to some example embodiments thereof, it will be understood that various changes in form and details may be made therein without departing from the spirit and scope of the following claims.

What is claimed is:

1. A method of operating a controller for controlling a memory device comprising a plurality of memory cell blocks, the method comprising:
   outputting block address information based on reliability information for each of the memory cell blocks, the reliability information generated based on weighted retention times and weighted program-erase counts;
   providing a patrol read command to the memory device; and controlling the memory device to perform a patrol read operation in response to the patrol read command such that the patrol read operation is performed in an ascending order of reliabilities of the memory cell blocks based on the reliability information, wherein the block address information comprises an order of the patrol read operation for the memory cell blocks based on the reliability information, and the order of the patrol read operation indicates a first memory cell block having a highest priority, a second memory cell block having a lowest priority and a third memory cell block having a priority between the highest priority and the lowest priority.

2. The method of claim 1, further comprising:

receiving information regarding reclaim target blocks on which reclaim operations are to be performed from among the memory cell blocks on which the patrol read operation is performed.

3. The method of claim 1, wherein the outputting comprises determining priorities to output the block address information based on retention times of respective ones of the memory cell blocks.

4. The method of claim 1, wherein the outputting comprises determining priorities to output the block address information based on program-erase counts of respective ones of the memory cell blocks.

5. The method of claim 1, wherein the outputting comprises updating the reliability information in response to the memory device entering an idle mode.

6. The method of claim 5, wherein the updating comprises determining priorities to output the block address information based on retention times or program-erase counts that correspond to the memory cell blocks, respectively.

7. The method of claim 6, wherein the determining priorities comprises determining at least one of the retention times or the program-erase counts of the memory cell blocks to be used to determine a priority to output the block address information.

8. The method of claim 7, wherein the determining at least one of the retention times or the program-erase counts of the memory cell blocks comprises setting a higher weight to the program-erase counts than to the retention times in response to a remaining life of the memory device being less than a threshold value.

9. The method of claim 7, wherein the determining at least one of the retention times or the program-erase counts of the memory cell blocks comprises setting a higher weight to the retention times than to the program-erase counts in response to a proportion of cold cell blocks being equal to or greater than a threshold proportion, where the cold cell blocks are cell blocks that have been accessed for a number of times smaller than a set number, from among the memory cell blocks.

10. The method of claim 6, wherein the outputting comprises determining a number of times to output block address information for each of the memory cell blocks based on a corresponding one of the priorities.

11. A method of operating a storage device comprising a memory device configured to perform patrol read operations, the method comprising:

controlling the memory device by providing block address information to the memory device based on a patrol read command and reliability information for each of a plurality of memory cell blocks, the reliability information generated based on weighted retention times and weighted program-erase counts;

generating information regarding reclaim target blocks on which reclaim operations are to be performed from among the memory cell blocks on which the patrol read operations are performed; and controlling the memory device to perform the patrol read operations in response to the patrol read command such that the patrol read operations are performed in an ascending order of reliabilities of the memory cell blocks based on the reliability information, wherein the block address information comprises an order of the patrol read operations for the memory cell blocks based on the reliability information, and the order of the patrol read operation indicates a first memory cell block having a highest priority, a second memory cell block having a lowest priority and a third memory cell block having a priority between the highest priority and the lowest priority.

12. The method of claim 11, wherein the controlling comprises determining priorities to output the block address information based on retention times of respective ones of the memory cell blocks.

13. The method of claim 11, wherein the controlling comprises determining priorities to output the block address information based on program-erase counts of respective ones of the memory cell blocks.

14. The method of claim 11, wherein the controlling comprises updating the reliability information in response to the storage device entering an idle mode.

15. The method of claim 14, wherein the updating comprises determining priorities to output the block address information based on retention times or program-erase counts that correspond to the memory cell blocks, respectively.

16. The method of claim 15, wherein the determining priorities comprises, determining at least one of the retention times or the program- erase counts of the memory cell blocks to be used to determine a priority to output the block address information, in response to the memory device entering the idle mode.

17. A controller for a storage device, the controller comprising:

at least one processor configured to,
generate a patrol read command in response to a patrol read instruction, and
generate block address information based on reliability information for each of a plurality of memory cell blocks included in the storage device the reliability information generated based on weighted retention times and weighted program-erase counts; and a memory interface configured to provide the patrol read command and the block address information to the storage device, wherein the block address information comprises an order of a patrol read operation for the memory cell blocks based on the reliability information, the at least one processor is further configured to perform the patrol read operation in response to the patrol read command such that the patrol read operation is performed in an ascending order of reliabilities of the memory cell blocks based on the reliability information, and the order of the patrol read operation indicates a first memory cell block having a highest priority, a second memory cell block having a lowest priority and a third memory cell block having a priority between the highest priority and the lowest priority.

18. The controller of claim 17, wherein the at least one processor is configured to determine priorities to generate the block address information based on retention times of respective ones of the memory cell blocks.

19. The controller of claim 17, wherein the at least one processor is configured to determine priorities to output the block address information based on program-erase counts of respective ones of the memory cell blocks.

20. The controller of claim 17, wherein the at least one processor is configured to update the reliability information in response to the storage device entering an idle mode.

\* \* \* \* \*